F. P. GRAVES.
NUT LOCK.
APPLICATION FILED JUNE 20, 1916.
1,213,097.
Patented Jan. 16, 1917.
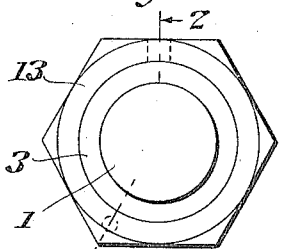
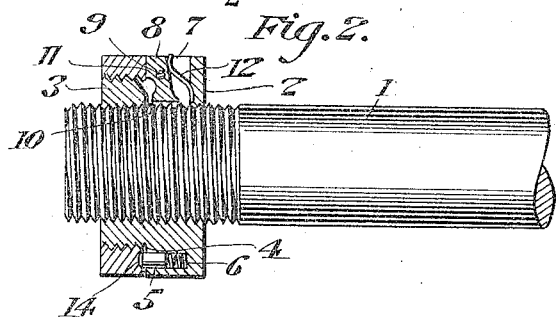
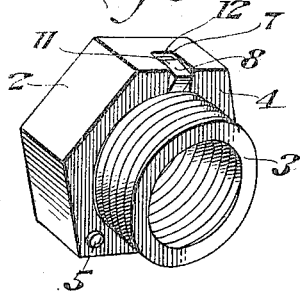
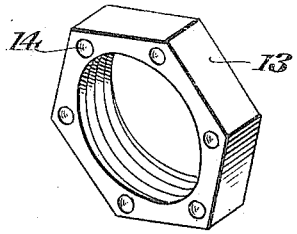
Inventor
Fredrick P. Graves
Witness
M. H. Slifer
By Victor J. Evans
Attorney

UNITED STATES PATENT OFFICE.

FREDRICK P. GRAVES, OF BICKNELL, INDIANA, ASSIGNOR OF FORTY-FIVE ONE-HUNDREDTHS TO NOVIE P. CLEVELAND, OF BICKNELL, INDIANA.

NUT-LOCK.

1,213,097.　　　　Specification of Letters Patent.　　Patented Jan. 16, 1917.

Application filed June 20, 1916.   Serial No. 104,729.

*To all whom it may concern:*

Be it known that I, FREDRICK P. GRAVES, a citizen of the United States, residing at Bicknell, in the county of Knox and State of Indiana, have invented new and useful Improvements in Nut-Locks, of which the following is a specification.

The present invention relates to improvements in means for locking a nut upon a bolt.

In carrying out my invention it is my purpose to provide a nut with a threaded neck portion of approximately one-half the width of the same which surrounds its bore or the inner threads thereof; to arrange in a suitable opening in the nut a pivoted dog which has one of its ends normally projecting over the shoulder between the nut and the neck thereof; to provide a locking collar upon the threaded neck which when contacting with the projecting end of the dog will swing the same to cause the opposite end thereof to enter the bore of the nut and to contact with the bolt engaging in the said bore, and to further provide means for locking the collar upon the bolt to hold the same in engagement with the dog, but to permit of the removal of the collar and the consequent unlocking of the dog, when desired.

With the above and other objects in view, the improvement resides in the construction, combination and arrangement of parts set forth in the following specification and falling within the scope of the appended claim.

In the drawing: Figure 1 is an elevation illustrating a nut constructed in accordance with my invention arranged upon a bolt, Fig. 2 is a sectional view on the line 2—2 of Fig. 1, Fig. 3 is a perspective view of the nut, and Fig. 4 is a similar view of the locking collar looking toward the underface thereof.

In the drawing, the numeral 1 designates a bolt and 2 a nut threaded upon the bolt. The neck which is threaded and which is approximately one-half the width of the nut and which surrounds the bore of the nut or the inner threads thereof is provided with both inner and outer threads, the inner threads providing a continuation of the threads in the bore of the nut. The shoulder 4 provided between the nut and the neck thereof is formed with a depression within which is received a pin 5 which has its outer end rounded and the said rounded end is normally projected through the said depression by a spring 6. The nut preferably diametrically opposite the pin 5 is formed with an opening 7 that communicates with its bore and also enters from the shoulder 4. Within this opening 7 is arranged an angular dog 8, the same comprising a right angular member and the said dog is pivoted in the opening 7, as indicated by the numeral 9. The inner face of this dog may be slotted longitudinally and may be provided with teeth 10 and the opposite angular end, indicated for distinction by the numeral 11 of the said dog, is normally projected over the shoulder 4, and a spring 12 may be employed for this purpose.

The numeral 13 designates a locking nut which is adapted to be screwed upon the outer threads of the neck 3 and to contact with the projecting end 11 of the dog 8 and to swing the toothed end 10 thereof to within the bore of the nut and consequently against the threads of the bolt 1. The inner face of the locking collar 13 at spaced intervals is provided with rounded or flared depressions 14, one of which being adapted to receive the projecting end of the pin 5 and so lock the collar upon the nut.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In a nut lock, a nut having a threaded neck portion of approximately one-half of the width of the nut and which surrounds the bore of the nut or the inner threads thereof, the shoulder of the nut at the juncture of the neck therewith having a spring pressed pin and being further provided with an angular pivoted dog received in an opening which communicates with the bore of the nut, and one end of the dog being normally projected over the shoulder, and a locking collar threaded upon the neck and having its inner face provided with spaced depressions, said collar adapted to contact with the projecting end of the dog to swing the same to cause the opposite end thereof to enter the bore of the nut to engage with the threads of the bolt and one of the referred to depressions adapted to receive the mentioned pin of the nut.

In testimony whereof I affix my signature.

FREDRICK P. GRAVES.

Copies of this patent may be obtained for five cents each, by addressing the "Commissioner of Patents, Washington, D. C."